US009954998B2

United States Patent
Ro

(10) Patent No.: US 9,954,998 B2
(45) Date of Patent: *Apr. 24, 2018

(54) METHOD OF EDITING CALL HISTORY INFORMATION IN MOBILE DEVICE AND MOBILE DEVICE CONTROLLING THE SAME

(71) Applicant: LG Electronics Inc., Seoul (KR)

(72) Inventor: Sijeong Ro, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

This patent is subject to a terminal disclaimer.

(21) Appl. No.: 14/693,465

(22) Filed: Apr. 22, 2015

(65) Prior Publication Data

US 2015/0229755 A1 Aug. 13, 2015

Related U.S. Application Data

(63) Continuation of application No. 12/972,234, filed on Dec. 17, 2010, now Pat. No. 9,032,305.

(30) Foreign Application Priority Data

Jun. 30, 2010 (KR) .................. 10-2010-0063041

(51) Int. Cl.
*G06F 3/0481* (2013.01)
*H04M 1/2745* (2006.01)
(Continued)

(52) U.S. Cl.
CPC ...... *H04M 1/72563* (2013.01); *G06F 3/0482* (2013.01); *H04M 3/2218* (2013.01);
(Continued)

(58) Field of Classification Search
CPC ...... H04M 1/274508; H04M 1/274533; G06F 3/0482
See application file for complete search history.

(56) References Cited

U.S. PATENT DOCUMENTS 6,516,202 B1 2/2003 Hawkins et al.
6,947,533 B2 9/2005 Okamura et al.
(Continued)

FOREIGN PATENT DOCUMENTS

JP 2006270659 A * 10/2006
KR 10-2005-0063248 A 6/2005
(Continued)

OTHER PUBLICATIONS

Machine translation of JP2006270659A, "Function for Calling Telephone Directory Editing Screen from Call Origination History/Call Arrival History," Oct. 5, 2006.*

(Continued)

*Primary Examiner* — Alvin Tan
(74) *Attorney, Agent, or Firm* — Birch, Stewart, Kolasch & Birch, LLP

(57) ABSTRACT

A method of displaying call history information in a first mobile device communicating with at least one second mobile device. The method according to one embodiment includes displaying a call history screen. The call history screen includes information on an outgoing call history, an incoming call history, a missed call history, and a video call history. The method according to the one embodiment further includes displaying a specific content on the display unit in an activated state in response to a selection of the specific content; displaying at least one edit screen after the specific content is selected; deleting selectively the selected specific content corresponding to a pre-stored name or multiple contents including non-selected content; and changing the pre-stored same name corresponding to the (Continued)

selected specific content into an edited name with changing the pre-stored same name corresponding to all of the non-selected content into the same edited name.

20 Claims, 17 Drawing Sheets

(51) Int. Cl.
    *H04M 1/725* (2006.01)
    *G06F 3/0482* (2013.01)
    *H04M 3/22* (2006.01)
    *H04W 8/18* (2009.01)
    *H04W 88/02* (2009.01)

(52) U.S. Cl.
    CPC ...... *H04W 8/183* (2013.01); *H04M 1/274583* (2013.01); *H04M 1/72547* (2013.01); *H04W 88/02* (2013.01)

(56) References Cited

U.S. PATENT DOCUMENTS

| | | | |
|---|---|---|---|
| 7,272,384 B2 | 9/2007 | Tsukamoto | |
| 7,814,438 B2 | 10/2010 | Grossman et al. | |
| 7,818,680 B2 | 10/2010 | Moody et al. | |
| 7,991,424 B2 * | 8/2011 | Batni | H04M 1/274583 340/573.1 |
| 8,014,760 B2 * | 9/2011 | Forstall | G06F 3/0482 379/142.01 |
| 8,320,547 B2 * | 11/2012 | Cho | H04M 1/56 379/207.15 |
| 8,886,260 B2 * | 11/2014 | Ryu | H04L 51/38 348/14.02 |
| 2006/0208861 A1 | 9/2006 | Stroupe et al. | |
| 2008/0189331 A1 | 8/2008 | Lee et al. | |
| 2009/0163178 A1 * | 6/2009 | Kim | H04M 1/56 455/412.1 |
| 2010/0050086 A1 | 2/2010 | Sherrard et al. | |
| 2011/0061006 A1 * | 3/2011 | Song | H04M 1/27455 715/760 |
| 2013/0040706 A1 * | 2/2013 | Kim | H04M 1/27455 455/564 |

FOREIGN PATENT DOCUMENTS

| | | |
|---|---|---|
| KR | 10-2006-0023633 A | 3/2006 |
| KR | 10-0651553 B1 | 11/2006 |

OTHER PUBLICATIONS

Samuel et al., "Mac OS X Leopard Bible", Wiley Publishing, Inc., ISBN 978-0-470-04174-1, 2008, pp. 531-542.

* cited by examiner

METHOD OF EDITING CALL HISTORY INFORMATION IN MOBILE DEVICE AND MOBILE DEVICE CONTROLLING THE SAME

CROSS-REFERENCE TO RELATED APPLICATIONS

This application is a continuation of copending U.S. application Ser. No. 12/972,234, filed on Dec. 17, 2010, which claims the benefit of earlier filing date and right of priority to Korean Application No. 10-2010-0063041, filed on Jun. 30, 2010. The contents of all of these applications are hereby incorporated by reference as fully set forth herein in their entirety.

BACKGROUND OF THE INVENTION

Field of the Invention

Some exemplary embodiments of the present disclosure relate to a mobile terminal and a control method thereof Description of Related Art Generally, a mobile terminal indicates an apparatus capable of performing a Global Positioning System (GPS) function, a communication function (or call function), and a function to transmit and receive contents (message, file, etc.), and capable of providing a performance result to a user

SUMMARY OF THE INVENTION

According to an aspect of the present disclosure there is provided a control method of a mobile terminal, the method including, displaying a function execution result screen on a display unit, displaying a pre-stored category screen on the display unit when one content is selected from the function execution result screen, and deleting information relating to the selected content when at least one category included in the displayed category screen is selected. The function execution result screen may be a message screen, a call history screen, a phone directory screen, a file screen, and an e-mail screen. The editing may be a correction or deletion of information corresponding to the selected content.

According to another aspect of the present disclosure, there is provided a mobile terminal including a display unit configured to display a function execution result screen and to display a pre-stored category screen when one content is selected from the function execution result screen, and a controller configured to delete information relating to the selected content when at least one category included in the displayed category screen is selected. The function execution result screen may be a message screen, a call history screen, a phone directory screen, a file screen, and an e-mail screen. The editing may be a correction or deletion of information corresponding to the selected content.

According to another aspect of the present disclosure, there is provided a control method of a mobile terminal, the method including displaying a function execution result screen on a display unit, displaying a pre-stored first screen on the display unit when one content is selected from the function execution result screen, receiving correction information corresponding to a correction of the selected content on the first screen, displaying a pre-stored category screen on the display unit upon completion of the content correction, and correcting information relating to the selected content based on the correction information when at least one category included in the displayed category screen is selected. The function execution result screen may be a message screen, a call history screen, a phone directory screen, a file screen, and an e-mail screen. The editing may be a correction or deletion of information corresponding to the selected content.

According to another aspect of the present disclosure, there is provided a mobile terminal including a display unit configured to display a function execution result screen and to display a pre-stored first screen when one content is selected from the function execution result screen, and a controller configured to control a pre-stored category screen to be displayed on the display unit when the selected content has been completely corrected on the displayed first screen. The function execution result screen may be a message screen, a call history screen, a phone directory screen, a file screen, and an e-mail screen. The editing may be a correction or deletion of information corresponding to the selected content.

The foregoing and other objects, features, aspects and advantages of the present invention will become more apparent from the following detailed description of the present invention when taken in conjunction with the accompanying drawings

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

Figure 1:
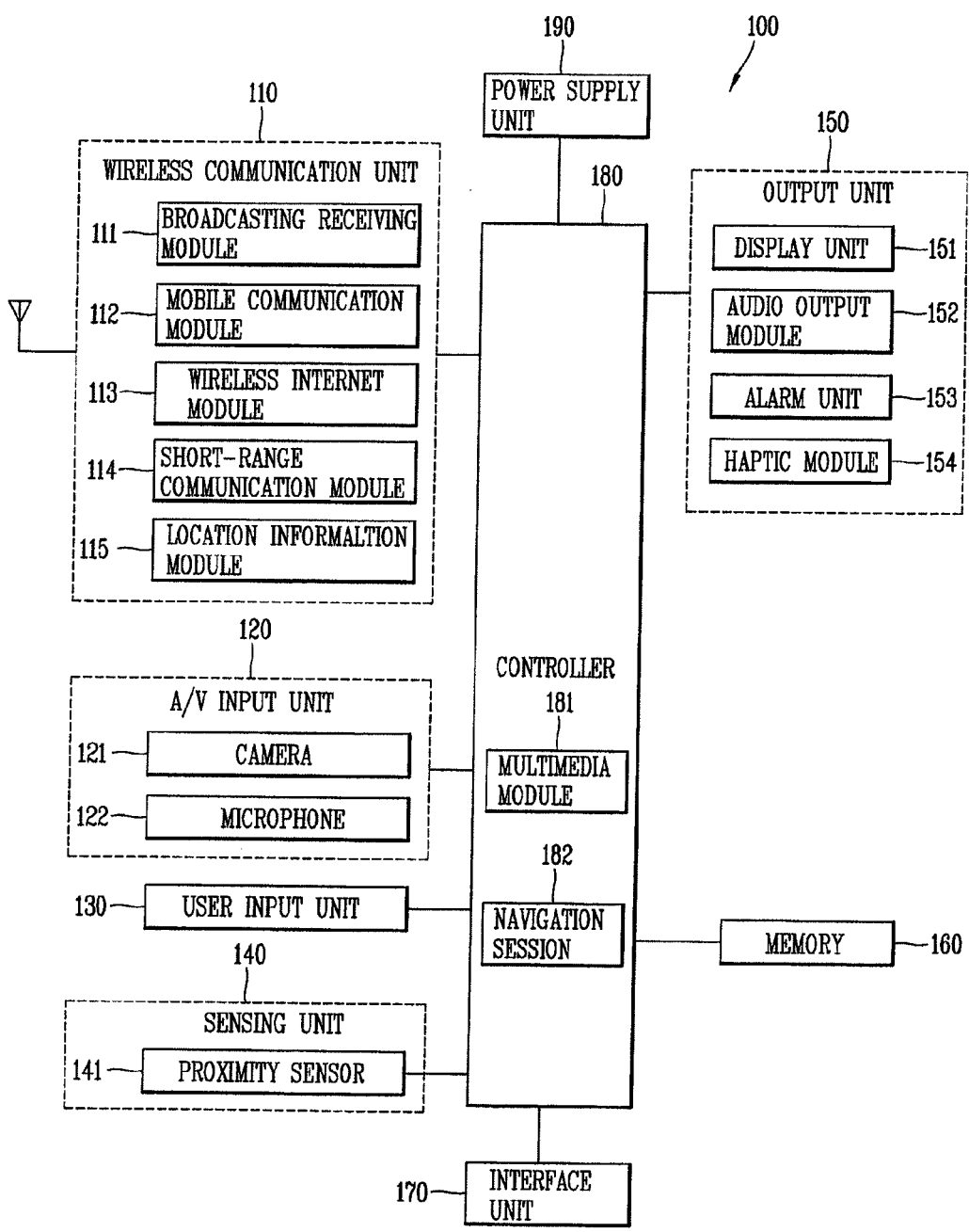
FIG. 1 is a block diagram showing a configuration of a mobile terminal for explaining a mobile terminal in accordance with one embodiment of the present invention.

FIG. 1 is a block diagram showing a configuration of a mobile terminal for explaining a mobile terminal 100 in accordance with one embodiment of the present invention.

The mobile terminal 100 may be implemented in various forms such as mobile phones, smart phones, notebook computers, digital broadcast terminals, PDAs (Personal Digital Assistants), PMPs (Portable Multimedia Player), navigation systems, etc.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, a location information module 115, etc.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal (when the mobile terminal is located in a vehicle, the location of the vehicle can be checked). For example, the location information module 115 may include a GPS (Global positioning system) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video acquired by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data to control an operation of the mobile terminal 100. The user input unit 130 may include a keypad, a dome switch, a touch pad (pressure/capacitance), a jog wheel, a jog switch, and the like. Particularly, when the touch pad forms an interlayer structure together with a display unit 151, it may be called a touch screen.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication. When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

In some implementations, a display of the display unit 151 is configured to be transparent or light-transmissive to allow viewing of the exterior. A transparent display may be, for example, a TOLED (Transparent Organic Light Emitting Diode) display. Through such configuration, the user can view an object positioned at the rear side of the terminal body through the region occupied by the display unit 151 of the terminal body.

The mobile terminal 100 may include two or more display units 151 according to an implementation method thereof. For example, the mobile terminal 100 may include a plurality of display units integrally or separately disposed on one surface, or a plurality of display units disposed on different surfaces.

Meanwhile, when a sensor (referred to as a 'touch sensor', hereinafter) for detecting a touch operation of the display unit 151 is overlaid in a layered manner (referred to as a 'touch screen'), the display unit 151 may function as both an input device and an output device. The touch sensor may have, for example, the form of a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input location and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

Recognition of the pointer located to be close to the touch screen without being in contact with the touch screen will be called a 'proximity touch', while recognition of actual contacting of a pointer on the touch screen will be called a 'contact touch'. In this case, when the pointer is in the state of the proximity touch, it means that the pointer is located to correspond vertically to the touch screen.

The proximity sensor 141 may detect a proximity touch and a proximity touch pattern (e.g., a proximity touch distance, a proximity touch speed, a proximity touch time, a proximity touch location, a proximity touch movement state, or the like), and output information corresponding to the detected proximity touch operation and the proximity touch pattern to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, a buzzer, etc.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (e.g., vibrations) to inform the user thereof. By providing such tactile outputs, the user can recognize the occurrence of various events. Outputs informing about the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store programs used for the processing and controlling operations performed by the controller 180, or may temporarily store data (e.g., a phonebook, messages, still images, video, etc.) that is inputted or outputted. The memory 160 may store data relating to various types of vibrations and sounds outputted when touch input is performed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images.

The power supply unit 190 receives external power or internal power and supplies appropriate power required for operating respective elements and components under control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180 itself.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180. A navigation session 182 applied to the mobile terminal 100 provides a general navigation function.

When deleting a pre-stored specific person's address, the controller 180 applied to the mobile terminal 100 of the present invention also selectively deletes messages exchanged with the specific person, a call history, relevant files, etc. classified into each category.

When changing a pre-stored specific person's address, the controller 180 applied to the mobile terminal 100 changes messages exchanged with the specific person, a call history, contents associated with a relevant file, etc. classified into each category, based on the changed contents.

Figure 2:
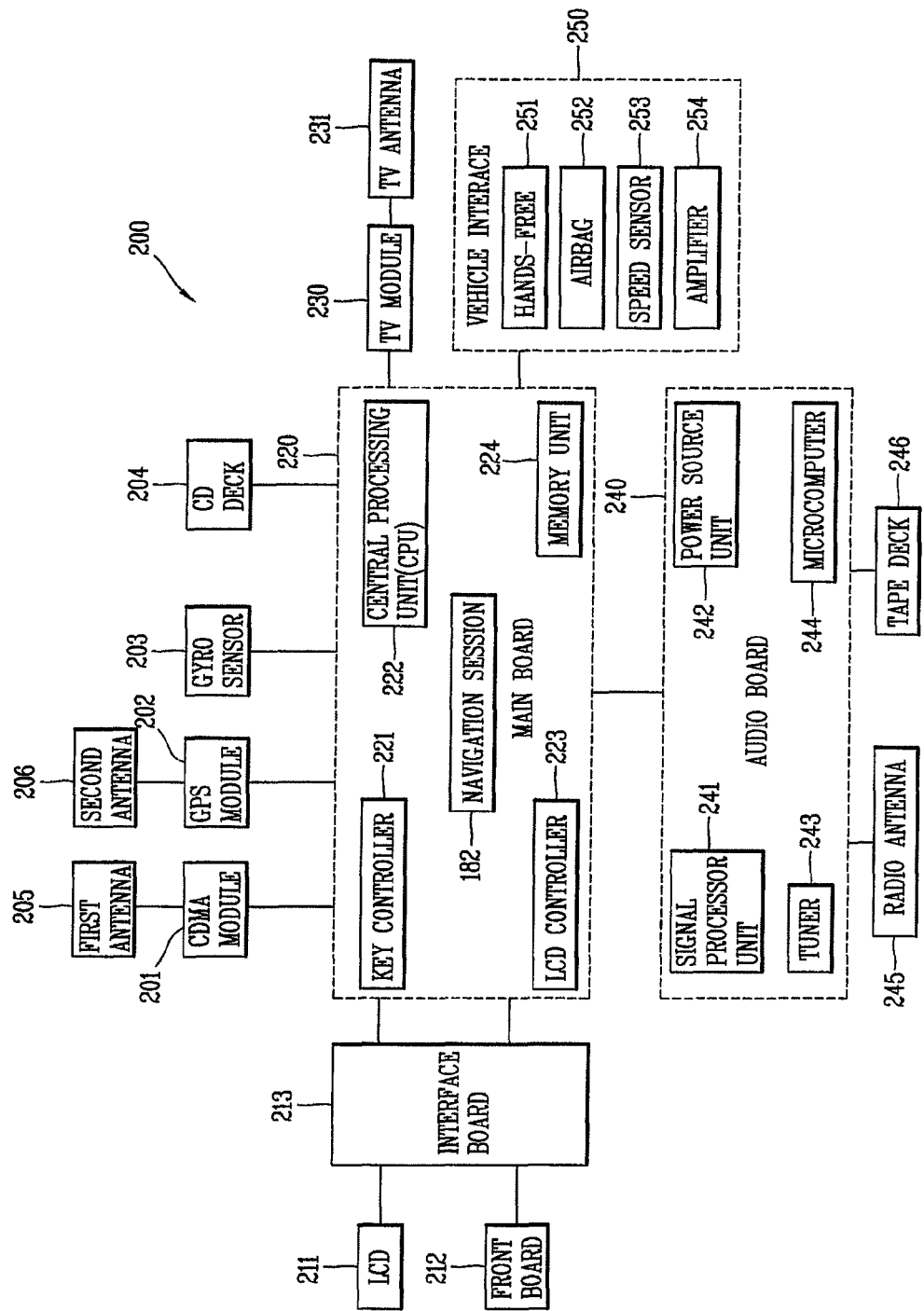
FIG. 2 is a block diagram showing a configuration of a telematics terminal for explaining a mobile terminal in accordance with one embodiment of the present invention.

FIG. 2 is a block diagram showing a configuration of a telematics terminal 200 for explaining a mobile terminal in accordance with one embodiment of the present invention.

As shown, the telematics terminal 200 includes a Central Processing Unit (CPU) 222 for controlling the telematics terminal 200 overall, a key controller 221 for controlling various key signals, an LCD controller 223 for controlling an LCD, and a main board 220 having therein a memory 224 for storing various kinds of information.

The memory 224 stores map information (map data) for displaying road guidance information on a map of the display unit (or the LCD 211). Also, the memory 224 stores a traffic information collecting control algorithm for inputting traffic information according to the situation of a road along which the vehicle currently travels (runs), and information for controlling the algorithm.

The main board 220 includes a communication module 201 assigned with a unique device number and performing a voice communication and data transmission/reception through a mobile terminal mounted in a vehicle, a GPS module 202 configured to guide a location of the vehicle, receive a GPS signal for tracking a travel route from a start point to a destination, generate data on a current position of the vehicle based on the received GPS signal, or transmit traffic information collected by a user as a GPS signal, a gyro sensor 203 configured to sense a running direction of the vehicle, a CD deck 204 configured to reproduce a signal recorded in a CD (Compact Disk), etc.

The communication module 201 and the GPS module 202 transmit and receive signals via a first antenna 205 and a second antenna 206, respectively.

The main board 220 is connected to a TV module 230 for receiving a broadcast signal via a broadcast signal antenna (or TV antenna) 231. The main board 220 is connected to a liquid crystal display (LCD) 211 controlled by the LCD controller 223 via an interface board 213.

The LCD 211 processes a broadcasting signal received through the TV module 230 and then displays the processed broadcasting signal, in the form of a video signal, on the LCD 211 via the interface board 213 under control of the LCD controller 223. In addition, the LCD 211 outputs an audio signal through an amplifier 254 under control of an audio board 240 and displays each kind of video signal or text signal based on control signals of the LCD controller 223. As discussed above, the LCD 211 may also be configured to receive an input from a user via a touch screen.

In addition, the main board 220 is connected to a front board 212 controlled by the key controller 221 via the interface board 213. The front board 212 configures buttons (or keys) and menus for enabling an input of a variety of key signals, and provides a key signal corresponding to the key (or button) selected by the user to the main board 220. The front board 212 may be provided with a menu key for allowing a direct input of traffic information, and the menu key may be configured to be controlled by the key controller 221.

The audio board 240 is connected with the main board 220 and processes various audio signals. The audio board 240 includes a microcomputer 244 for controlling the audio board 240, a tuner 243 for receiving a radio signal through an antenna (or radio antenna) 245, a power source unit 242 for supplying power to the microcomputer 244 and a signal processing unit 241 for processing various voice signals for output.

The audio board 240 also includes a radio antenna 245 for receiving a radio signal and a tape deck 246 for reproducing an audio tape. The audio board 240 may further include an amplifier 254 for outputting a voice signal processed by the audio board 240.

The amplifier 254 is connected to a vehicle interface 250. Namely, the audio board 240 and the main board 220 are connected to the vehicle interface 250, respectively. A handsfree 251 for inputting a voice signal without using a driver's hand, an airbag 252 configured for the security of a passenger, a speed sensor 253 for detecting the speed of the vehicle, or the like, may be connected to the vehicle interface 250.

The speed sensor 253 calculates a vehicle speed and provides the calculated vehicle speed information to the CPU 222.

The navigation session 182 applied to the mobile terminal 200 provides a general navigation function.

When deleting a pre-stored specific person's address, the CPU 222 applied to the telematics terminal 200 of the present invention also selectively deletes messages exchanged with the specific person, a call history, relevant files, etc. classified into each category.

When changing a pre-stored specific person's address, the CPU 222 applied to the telematics terminal 200 changes, based on the changed contents, messages exchanged with the specific person, a call history, contents associated with a relevant file, etc. each classified into a category.

Hereinafter, a configuration of the mobile terminal according to the present invention will be explained with reference to FIG. 3. The mobile terminal of FIG. 3 may be applied to various mobile terminals including not only the mobile terminal 100 and the telematics terminal 200, but also a smart phone, a portable terminal, a mobile terminal, a personal digital assistant (PDA), a notebook computer, a wibro, an Internet Protocol Television (IPTV), a television, a telematics terminal, a navigation, an audio video navigation (AVN), etc.

Figure 3:
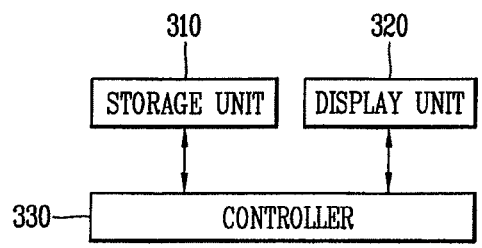
FIG. 3 is a block diagram showing a configuration of a mobile terminal in accordance with one embodiment of the present invention.

FIG. 3 is a block diagram showing a configuration of a mobile terminal in accordance with one embodiment of the present invention. As shown, the mobile terminal 300 comprises a storage unit 310, a display unit 320 and a controller 330. However, all of the illustrated components of the mobile terminal 300 are not absolutely required. That is, the mobile terminal 300 may be implemented by greater or fewer components.

The storage unit 310 stores various types of menu screens, various user interfaces (UI) and/or a graphic user interface (GUI). The storage unit 310 also stores information on any person (hereinafter, will be referred to as a 'personal information entry'). Here, the information related to the personal information entry includes a name, a telephone number, a photo, an e-mail address, a date of birth, an address, a memo, information on a storage position (icon information such as a mobile phone, home, company, and fax), group information, an abbreviated number, bell sound information, etc.

The storage unit 310 stores an image file associated with the personal information entry, a document file (a word file including doc, rtf, txt, etc., a Korean alphabet file including hwp, etc., a pdf file, etc.), an image file (including a still image, a moving image, etc.), etc. That is, when storing a file transmitted from any mobile terminal, the storage unit 310 also stores information on a relation between the file and the personal information entry.

The storage unit 310 stores an e-mail address associated with the personal information entry. That is, when sending a message to any e-mail address or receiving a message from the e-mail address, the storage unit 310 stores information on a relation between the e-mail address and the personal information entry together.

The storage unit 310 stores data, a program, etc. required to operate the mobile terminal 300. The storage unit 310 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk.

The display unit 320 displays various contents such as various menu screens under control of the controller 330, by using a user interface and/or a graphic user interface included in the storage unit 310. Here, the content output on the display unit 320 may include menu screens for outputting various text or image data (including other types of information data), and data such as icons, list menus, combo boxes and the like.

The display unit 320 displays a function execution result screen under control of the controller 330. Here, the function execution result screen may include a screen displaying an execution result of a message function (or a message screen), a screen displaying an execution result of a call history function (or a call history screen), a screen displaying an execution result of a phone directory function (or a phone directory screen), a screen displaying an execution result of a file function (or a file screen), a screen displaying an execution result of an e-mail function (or an e-mail screen), etc.

Here, the message screen may include information on a message transmitted to any mobile terminal, information on a message received from any mobile terminal, personal information entry on any mobile terminal, etc. The call history screen may include information on an outgoing call history to any mobile terminal, information on an incoming call history from any mobile terminal, information on a missed call history about any mobile terminal, information on a reception standby call history about any mobile terminal, information on a video call history about any mobile terminal, and personal information entry on any mobile terminal. The phone directory screen may include personal information entry, etc.

The file screen may include information on a history of an outgoing file (image file, document file, moving image file, etc.) to any mobile terminal, information on a history of a reception file from any mobile terminal, a voice file/moving image file stored when performing a call/video conference with any mobile terminal, personal information entry on any mobile terminal.

The e-mail screen may include information on a history of an e-mail transmitted to any mobile terminal (or any e-mail address), information on a history of an e-mail received from any mobile terminal, personal information entry on any mobile terminal, etc.

The screen displayed on the display unit 320 and displaying an execution result with respect to any function may be variously set according to a user's design. The display unit 320 may include at least one of a Liquid Crystal Display (LCD), a Thin Film Transistor-LCD (TFT-LCD), an Organic Light Emitting Diode (OLED) display, a flexible display, or a three-dimensional (3D) display.

The mobile terminal 300 may include two or more display units 320 according to an implementation method thereof. For example, the mobile terminal 300 may include a plurality of display units integrally or separately disposed on one surface, or a plurality of display units disposed on different surfaces.

The display unit 320 may function as an input device as well as an output device. The touch sensor may have, for example, the form of a touch film, a touch sheet, a touch pad, a touch panel, and the like. The touch sensor may be configured to convert pressure applied to a particular portion of the display unit 320 or a change in the capacitance or other electrical characteristic at a particular portion of the display unit 320 into an electrical input signal. The touch sensor may be configured to detect the pressure when a touch is applied, as well as the touched position and area. When there is a touch input with respect to the touch sensor, a corresponding signal is transmitted to a touch controller (not shown). The touch controller processes the signals and transmits corresponding data to the controller 330. Accordingly, the controller 330 may recognize which portion of the display unit 320 has been touched. The display unit 320 may include a proximity sensor. The proximity sensor may be disposed within or near the touch screen.

The proximity sensor is a sensor for detecting the presence or absence of an object relative to a certain detection surface or an object that exists nearby using the force of electromagnetism or infrared rays without a physical contact. Thus, the proximity sensor can have a considerably longer life span than a contact type sensor and can be utilized for various purposes.

Examples of the proximity sensor may include a transmission type photoelectric sensor, a direct reflection type photoelectric sensor, a mirror-reflection type photo sensor, an RF oscillation type proximity sensor, a capacitance type proximity sensor, a magnetic proximity sensor, and an infrared proximity sensor. If the touch screen is a capacitance type touch screen, proximity of the pointer can be detected by a change in electric field according to the proximity of the pointer. In this case, the touch screen may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor, a proximity touch and a proximity touch pattern (e.g., a proximity touch distance, a proximity touch speed, a proximity touch time, a proximity touch position, or a proximity touch movement state) can be detected, and information corresponding to the detected proximity touch operation and the proximity touch pattern can be outputted to the touch screen.

When the display unit is used as an input device, command or control signals may be inputted through a user's button manipulation, or by touching/scrolling a displayed screen.

The controller 330 controls an overall operation of the mobile terminal 300. When a user selects at least one personal information entry from one or more personal information entries included in a phone directory displayed on the display unit 320, the controller 330 displays a category screen pre-stored in the storage unit 310 on the display unit 320.

When the user selects at least one category from a category screen displayed on the display unit 320, the controller 330 deletes the selected at least one personal information entry from the phone directory. And, the controller 330 deletes all information associated with the at least one personal information entry included in the selected at least one category. Here, the categories included in the category screen displayed on the display unit 320, or the at least one category may include a message category, a call history category, a file category, an e-mail category, etc.

When one content is selected from a plurality of contents included in a function execution result screen displayed on the display unit 320, the controller 330 displays a category screen pre-stored in the storage unit 310 on the display unit

320. Here, the pre-stored category screen may be a screen generated under control of the controller 330 based on a user interface screen and/or a graphic user interface screen pre-stored in the storage unit 310.

When the category screen is referred to as a main category screen, the controller 330 may be configured to include one or more sub-categories with respect to any category included in the main category. For instance, in case of a message category, the message category may include therein sub-categories such as an outgoing message category and an incoming message category. In case of a call history category, the call history category may include therein sub-categories such as an outgoing call history category, an incoming call history category, a missed call history category, a reception standby call history category, and a video call history category.

When the user selects at least one category from the category screen displayed on the display unit 320, the controller 330 deletes information associated with the one selected content included in the selected at least one category. Here, the category included in the category screen displayed on the display unit 320, or the one or more categories may include a selected content category, a category including a selected content, a message category, a call history category, a phone directory category, a file category, an e-mail category, etc.

When the user selects one personal information entry from one or more personal information entries included in the phone directory displayed on the display unit 320, the controller 330 displays a screen pre-stored in the storage unit 310 and including an edit screen, a keypad, etc. on the display unit 320.

Once one personal information entry included in a pre-stored screen displayed on the display unit 320 is corrected by the user's input, correction information (e.g., correction information on the one personal information entry) is received. Then, a category screen pre-stored in the storage unit 310 is displayed on the display unit 320.

Once at least one category is selected by the user from the category screen displayed on the display unit 320, the selected one personal information entry from the phone directory is corrected based on the corrected personal information entry (or the correction information). Then, all information relating to the one personal information entry included in the selected at least one category is corrected. Here, the category or the at least one category included in the category screen displayed on the display unit 320 may include a message category, a call history category, a file category, an e-mail category, etc. Once one of a plurality of contents included in a function execution result screen displayed on the display unit 320 is selected, the controller 330 displays a screen pre-stored in the storage unit 310 and including an edit screen, a keypad, etc. on the display unit 320.

Once one content included in a pre-stored screen displayed on the display unit 320 is corrected by the user's input, correction information (e.g., correction information on the one content) is received. Then, the category screen pre-stored in the storage unit 310 is displayed on the display unit 320.

Once at least one category is selected by the user from the category screen displayed on the display unit 320, information relating to the selected one content included in the selected at least one category is corrected based on the corrected content (or the correction information). Here, the category or the at least one category included in the category screen displayed on the display unit 320 may include a selected content category, a category including selected content, a message category, a call history category, a phone directory category, a file category, an e-mail category, etc.

The category or the at least one category included in the category screen displayed on the display unit 320 may be variously set according to a designer or a user's request. The mobile terminal 300 may further comprise a voice output unit (not shown) configured to output voice information included in a signal processed by the controller 330. Here, the voice output unit may be implemented as a speaker. The voice output unit is also configured to output voice information included in an execution result of an application program under control of the controller 330.

The mobile terminal 300 may further comprise an input unit (not shown) configured to receive a signal responsive to a user's button manipulation or selection of a particular function, or receive a command or control signal generated by a manipulation such as touching/scrolling of a displayed screen.

The input unit may also receive a signal corresponding to information input by a user, and be configured by using various devices, such as a keypad, a touch screen, a dome switch, a touch pad, a jog & shuttle, a mouse, a stylus pen, a touch pen, a microphone, a camera, and the like.

The mobile terminal 300 may further comprise a communication unit (not shown) configured to perform a communication function with any terminal. The communication unit may include a radio internet module or a short-range communication module. Here, the radio internet module may include wireless LAN (WLAN), Wi-Fi, Wireless Broadband (Wibro), World Interoperability for Microwave Access (Wimax), High Speed Downlink Packet Access (HSDPA), etc. And, the short-range communication module may include Bluetooth, Radio Frequency Identification (RFID), Infrared Data Association (IrDA), Ultra Wideband (UWB), Zigbee, etc.

When deleting a pre-stored specific person's address, messages exchanged with the specific person, a call history, relevant files, etc. classified into each category may be together deleted in a selective manner.

When changing a pre-stored specific person's address, messages exchanged with the specific person, a call history, and contents associated with a relevant file classified into each category may be together changed.

Hereinafter, the control method of a mobile terminal according to the present invention will be explained in more detail with reference to FIGS. 1 to 11.

Figure 4:
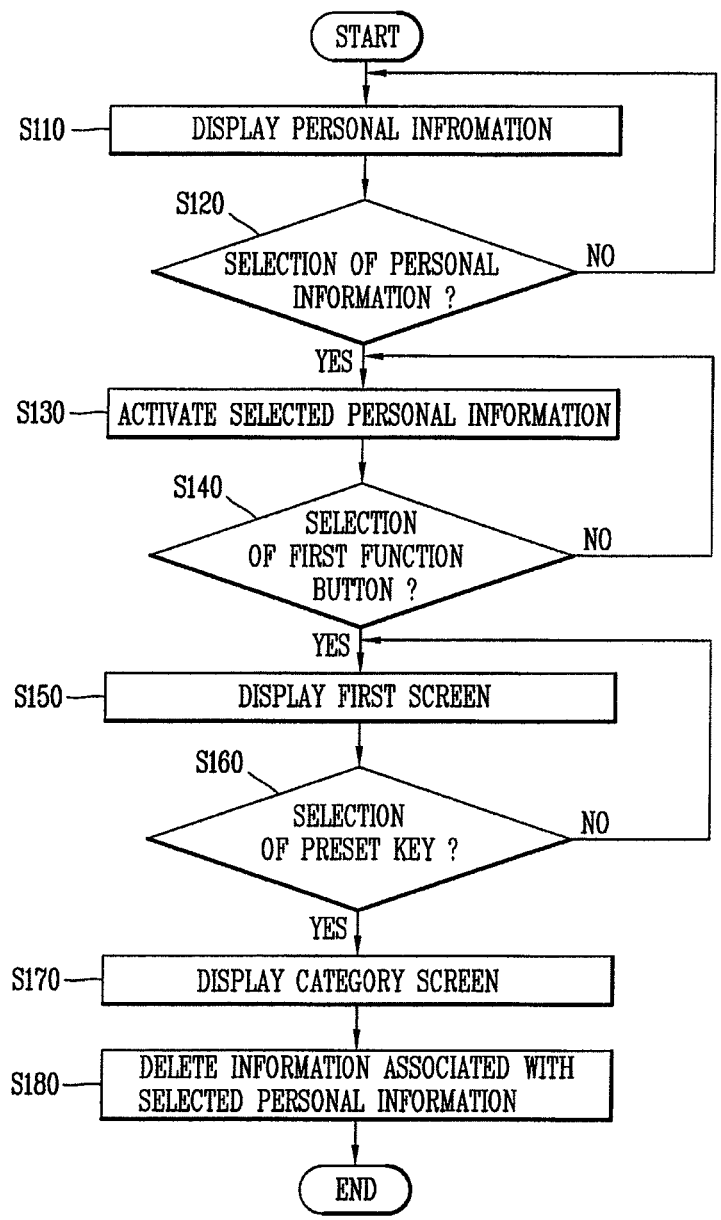
FIG. 4 is a flowchart showing a control method of a mobile terminal in accordance with a first embodiment of the present invention.

FIG. 4 is a flowchart showing a control method of a mobile terminal in accordance with a first embodiment of the present invention.

Firstly, the controller 330 displays, on the display unit 320, one or more personal information entries included in a phone directory pre-stored in the storage unit 310. Here, information related to the personal information entry includes a name, a telephone number, a photo, an e-mail address, a date of birth, an address, a memo, information on a storage position (including icon information such as a mobile phone, home, company, and fax), group information, an abbreviated number, bell sound information, etc.

Figure 5A:
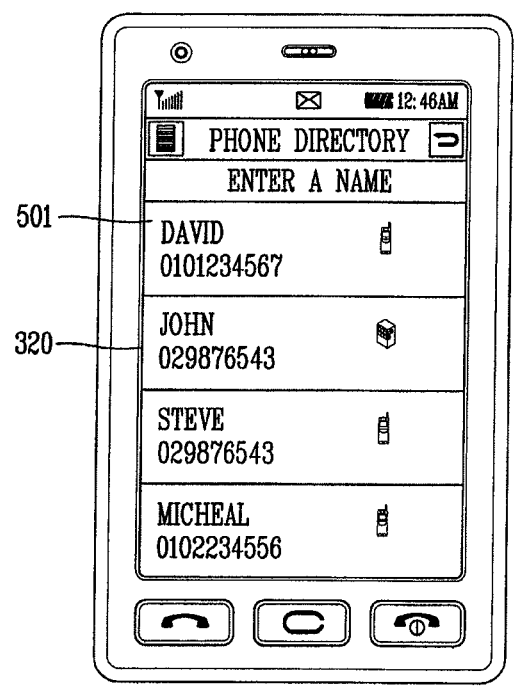
FIGS. 5A to 5E are views showing a screen of a display unit in accordance with a first embodiment of the present invention.
Figure 5B:
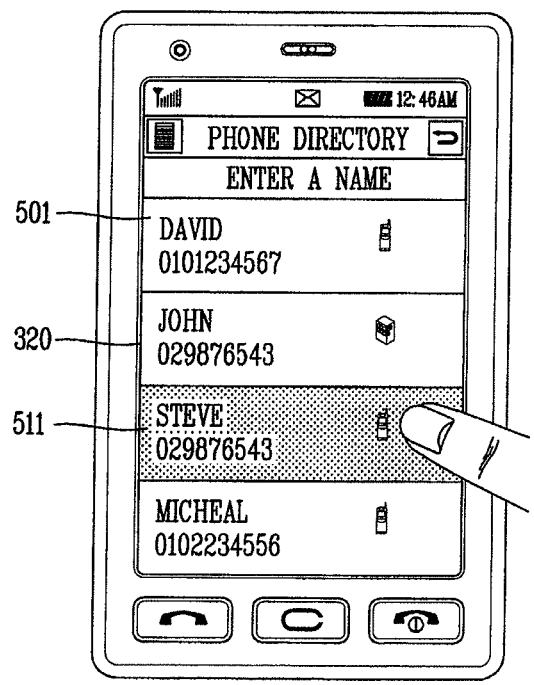

For instance, as shown in FIG. 5A, the controller 330 displays a plurality of personal information entries (David, John, Steve, Michael, etc.) 501 on the display unit 320 (S110). Then, the controller 330 checks whether at least one is selected by a user from one or more personal information entries displayed on the display unit 320 (S120).

If at least one is selected by the user from the one or more personal information entries as a check result, the controller 330 displays the selected at least one personal information entry on the display unit 320 in an activated state. Here, the user's input for selecting at least one from one or more personal information entries displayed on the display unit 320 may be a touch input. And, touch on the display unit 320 may be one of proximity touch and contact touch.

For instance, when a user selects "Steve" from one or more personal information entries (David, John, Steve, Michael, etc.) 501 displayed on the display unit 320, the controller 330 displays personal information entry 511 corresponding to the selected "Steve" in an activated state (S130).

Then, in a state that the at least one personal information entry has been selected, the controller 330 checks whether a pre-stored first function button provided at the mobile terminal 300 (or first functional key, e, g, a deletion button), and/or a pre-stored first function button (or first function key, e, g, a deletion button) displayed on the display unit 320 is selected (S140).

If the pre-stored first function button provided at the mobile terminal 300 is selected as a check result in a state that the at least one personal information entry has been selected, the controller 330 displays a pre-stored first screen corresponding to the selected first function button (e.g., a deletion inquiry screen) on the display unit 320.

For instance, if a deletion button (not shown), a pre-stored first function button provided at the mobile terminal 300 is selected in a state that the personal information entry 511 corresponding to the "Steve" has been selected, the controller 330 displays a deletion inquiry screen 520 corresponding to the selected deletion button on the display unit 320 (S150).

Then, the controller 330 determines whether a preset key (e.g., 'YES' key) is selected, by the user, from various keys included in the displayed first screen (e.g., 'YES (OK)' key, 'NO(CANCEL)' key, etc.) (S160). Once the preset key is selected by the user, the controller 330 displays a category screen pre-stored in the storage unit 310 on the display unit 320. Here, the category screen may include a message category, a call history category, a file category, an e-mail category, etc. The category may be classified and/or set by a designer or a user's request in an adding or changing manner.

Figure 5C:
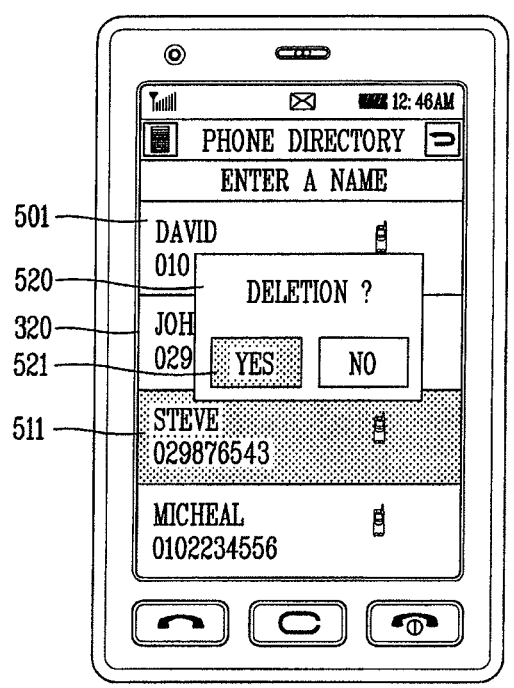
Figure 5D:
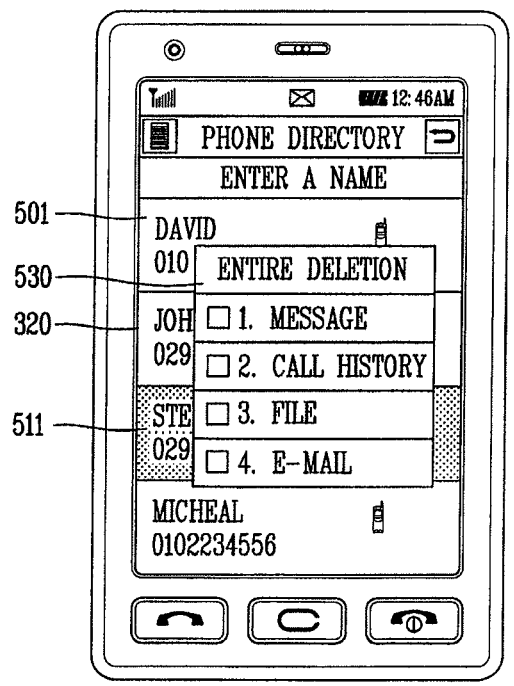

For instance, when a preset 'YES' key 521 is selected from the deletion inquiry screen 520 shown in FIG. 5C, the controller 330 displays a category screen 530 on the display unit 320 as shown in FIG. 5D. Once at least one personal information entry is selected by the user, from the one or more personal information entries as a check result in S120, the controller 330 may display the category screen pre-stored in the storage unit 310 on the display unit 320 (S170).

Then, if at least one category is selected by the user from the category screen displayed on the display unit 320, the controller 330 deletes not only at least one personal information entry selected from the phone directory, but also information relating to the at least one personal information entry included in the selected at least one category (e.g., a name, a phone number, a photo, an e-mail address, an address, etc. included in the personal information entry).

Figure 5E:
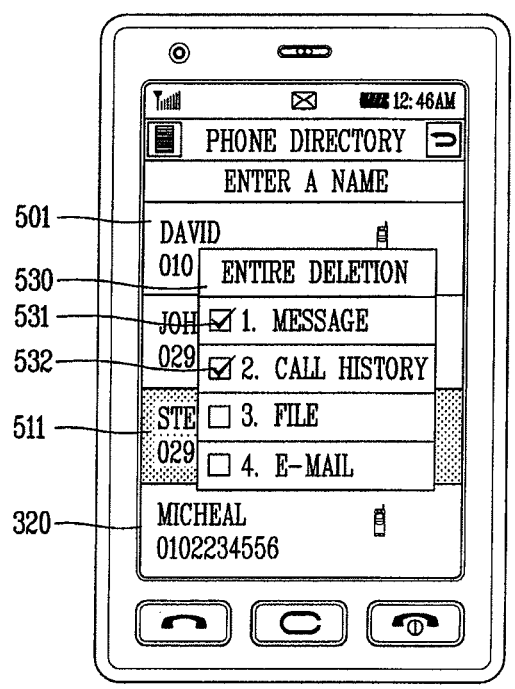

As shown in FIG. 5E, when a message category 531 and a call history category 532 are selected from the category screen 530, and a preset function button, "OK" button (not shown) is selected, the controller 330 deletes not only personal information entry 511 corresponding to the selected "Steve", but also "Steve"—related information included in the selected message category 531 and the call history category 532.

That is, the controller 330 deletes "Steve"-related personal information entries stored in the phone directory. Also, when the selected message category includes a "Steve"-related message (e.g., an outgoing message and/or an incoming message, etc.), the controller 330 deletes all "Steve"-related messages. Furthermore, when the selected call history category includes a "Steve"-related call history (e.g., an outgoing call history, an incoming call history, a missed call history, a reception standby call history, a video call history, etc.), the controller 330 deletes all "Steve"-related call histories (S180).

When deleting any phone number included in the phone directory, the mobile terminal 300 may selectively delete not only the corresponding phone number included in the phone directory, but also information relating to the corresponding phone number within other category included in the mobile terminal 300.

Figure 6:
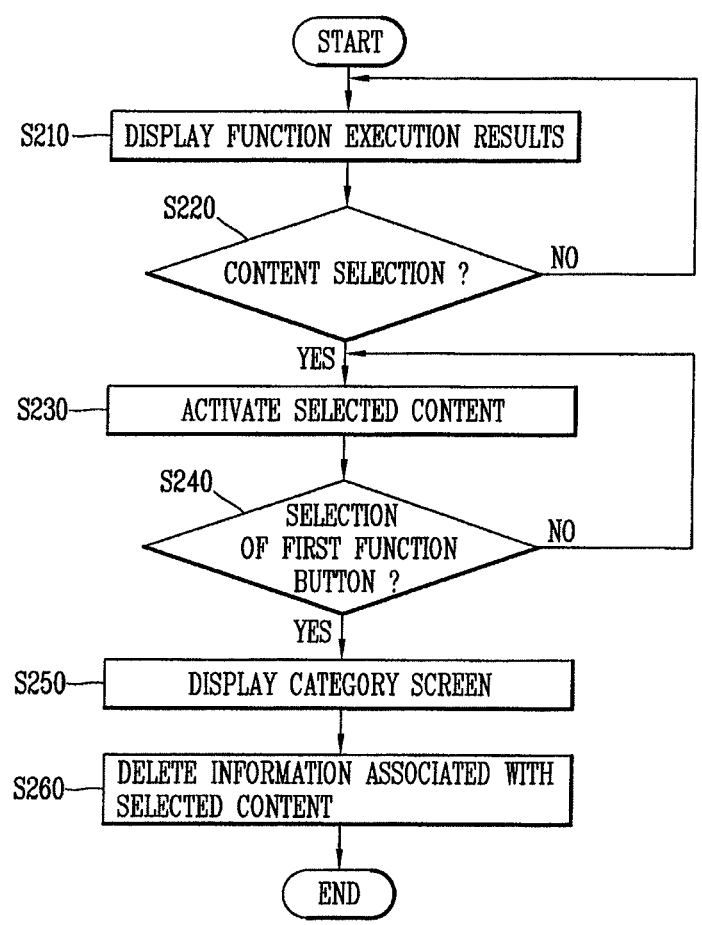
FIG. 6 is a flowchart showing a control method of a mobile terminal in accordance with a second embodiment of the present invention.

FIG. 6 is a flowchart showing a control method of a mobile terminal in accordance with a second embodiment of the present invention.

Firstly, the controller 330 executes any function (any application program) pre-stored in the storage unit 310, and displays an execution result of the function (data or a function execution result screen) on the display unit 320. Here, the any function includes a message function, a call history function, a phone directory function, a file function, an e-mail function, etc.

Figure 7A:
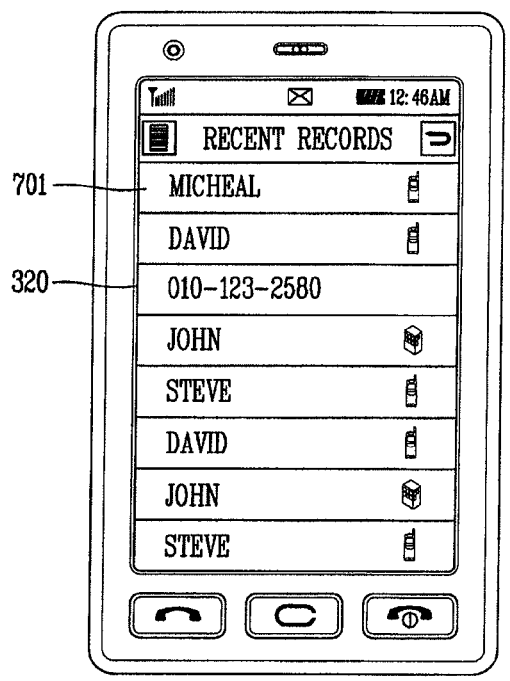
FIGS. 7A to 7E are views showing a screen of a display unit in accordance with a second embodiment of the present invention.

For instance, as shown in FIG. 7A, the controller 330 displays, on the display unit 320, a call history, an execution result of a call history function (e.g., an outgoing call history, an incoming call history, a missed call history, a reception standby call history, a video call history, an outgoing message history, an incoming message history, etc.) 701 (S210).

Then, the controller 330 checks whether one content is selected by the user from the function execution results displayed on the display unit 320 (S220). If one content is selected by the user from the function execution results as a check result, the controller 330 displays the selected content on the display unit 320 in an activated state. Here, the user's input for selecting one content from the function execution results displayed on the display unit 320 may be a touch input. And, touch on the display unit 320 may be one of proximity touch and contact touch.

Figure 7B:
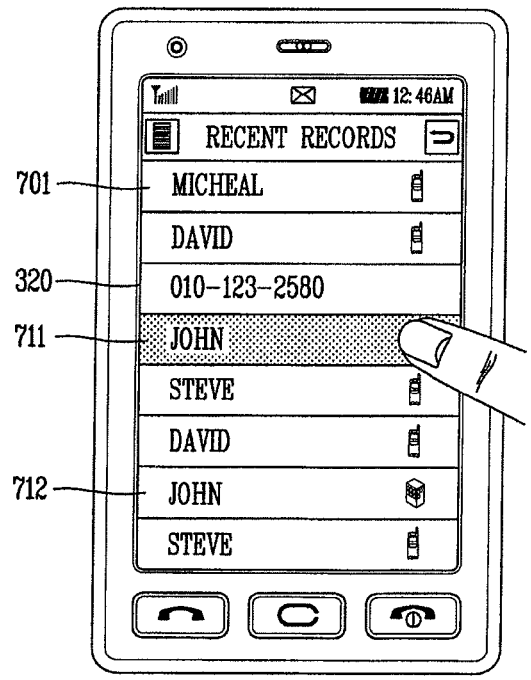

For instance, when a user selects 'John' from a call history 701 displayed on the display unit 320, the controller 330 displays call history information 711 corresponding to the selected 'John' in an activated state as shown in FIG. 7B (S230).

Then, in a state that the content has been selected, the controller 330 checks whether a pre-stored first function button provided at the mobile terminal 300 (or first functional key, e, g, a deletion button), and/or a pre-stored first function button (or first function key, e.g., a deletion button) displayed on the display unit 320 is selected (S240).

If the pre-stored first function button provided at the mobile terminal 300 is selected as a check result in a state that the content has been selected, the controller 330 displays a category screen pre-stored in the storage unit 310 and corresponding to the selected first function button on the display unit 320. Here, the category screen may include a selected content (call history), a current category (corresponding to the call history category), a phone directory category, a message category, a file category, an e-mail category, etc. The category may be classified and/or set by a designer or a user's request in an adding or changing manner.

Figure 7C:
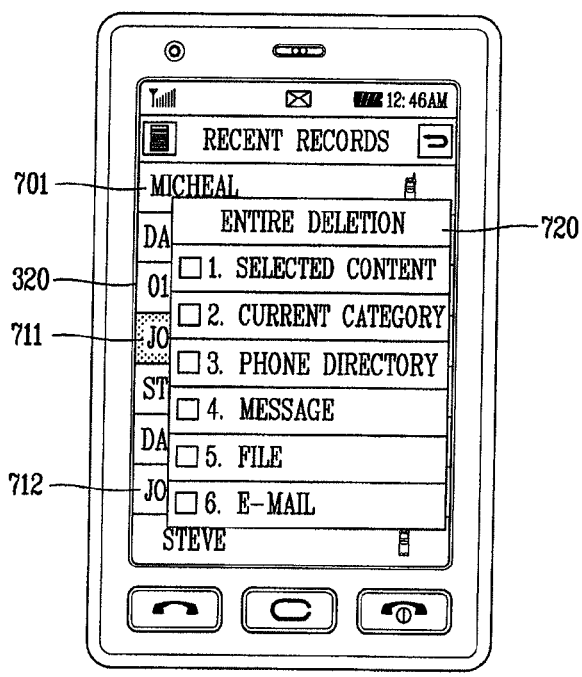

For instance, if a deletion button (not shown), a pre-stored first function button provided at the mobile terminal 300 is selected in a state that the content corresponding to the 'John' (call history information) 711 has been selected, the controller 330 displays a category screen 720 on the display unit 320 as shown in FIG. 7C.

Once one content is selected from a plurality of contents included in the function execution results as a check result in S220, the controller 330 may display the category screen pre-stored in the storage unit 310 on the display unit 320 (S250).

Then, if at least one category is selected by the user from the category screen displayed on the display unit 320, the controller 330 deletes information relating to the selected content included in the selected at least one category (e.g., a name, a phone number, a photo, an e-mail address, an address, etc. included in personal information entry corresponding to the content).

Figure 7D:
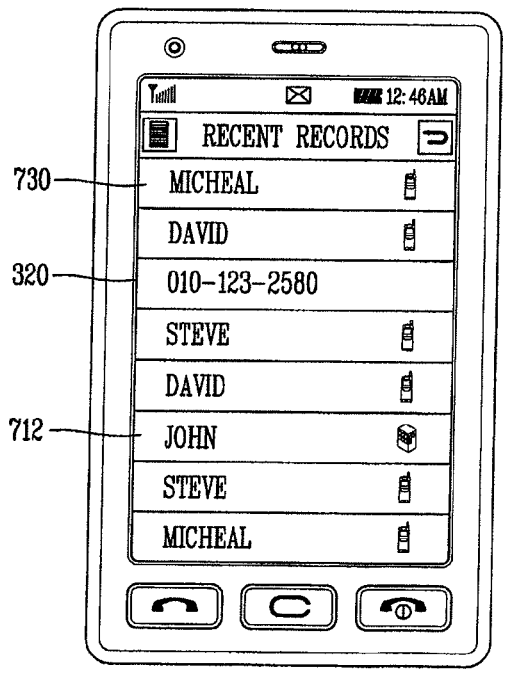

As one example, when a 'selected content' category is selected from the category screen 720 shown in FIG. 7C, the controller 330 deletes the call history information 711 corresponding to the selected 'John' according to the selected content, from the call history 701. FIG. 7D is a view showing a deleted state 730 of the call history information 711 corresponding to the 'John'. As shown in FIG. 7D, only the call history information 711 corresponding to the selected 'John' according to the selected content is deleted, but call history information 712 corresponding to another 'John' is maintained.

Figure 7E:
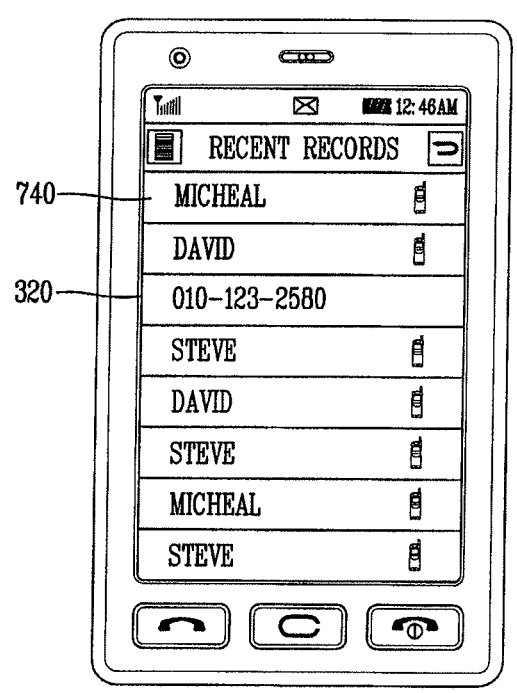

As another example, when a 'current category' is selected from the category screen 720 shown in FIG. 7C, the controller 330 deletes all information corresponding to the selected 'John' according to the selected content, from the call history 701. FIG. 7E is a view showing a deleted state 740 of all the call history information 711 and 712 corresponding to the 'John' within the call history 701 corresponding to the 'current category'.

As still another instance, when a 'selected content' category and a 'phone directory' category are selected from the category screen 720 shown in FIG. 7C, the controller 330 deletes the call history information 711 corresponding to the 'John' according to the selected content from the call history 701. And, the controller 330 deletes all of 'John'-related information (including personal information entry) included in the phone directory category.

As yet still another instance, when a 'selected content' category and a 'message' category are selected from the category screen 720 shown in FIG. 7C, the controller 330 deletes the call history information 711 corresponding to the 'John' according to the selected content from the call history 701. And, the controller 330 deletes all of 'John'-related information included in the message category (S260).

Figure 8:
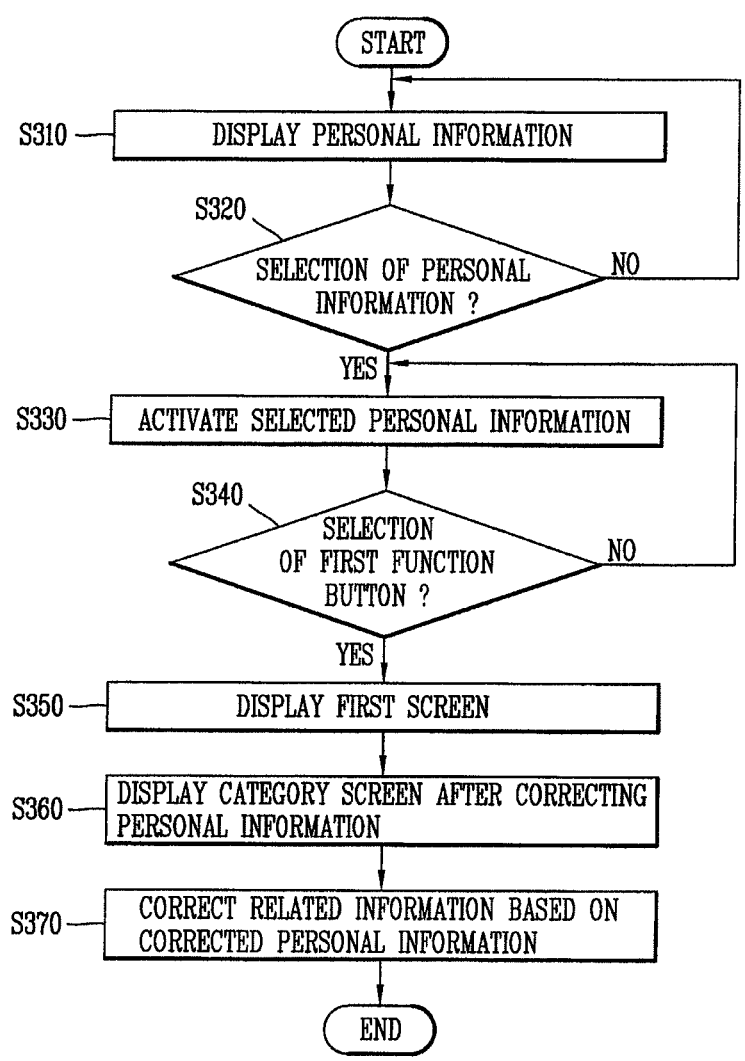
FIG. 8 is a flowchart showing a control method of a mobile terminal in accordance with a third embodiment of the present invention.

FIG. 8 is a flowchart showing a control method of a mobile terminal in accordance with a third embodiment of the present invention.

Firstly, the controller 330 displays, on the display unit 320, one or more personal information entries included in a phone directory pre-stored in the storage unit 310. Here, information related to the personal information entry includes a name, a telephone number, a photo, an e-mail address, a date of birth, an address, a memo, information on a storage position (including icon information such as a mobile phone, home, company, and fax), group information, an abbreviated number, bell sound information, etc.

For instance, as shown in FIG. 5A, the controller 330 displays a plurality of personal information entries (David, John, Steve, Michael, etc.) 501 on the display unit 320 (S310).

Then, the controller 330 checks whether one is selected by the user from one or more personal information entries displayed on the display unit 320 (S320).

If one is selected by the user from the one or more personal information entries as a check result, the controller 330 displays the selected one or more personal information entries on the display unit 320 in an activated state. Here, the user's input for selecting at least one from one or more personal information entries displayed on the display unit 320 may be a touch input. And, touch on the display unit 320 may be one of proximity touch and contact touch.

For instance, when a user selects "Steve" from one or more personal information entries (David, John, Steve, Michael, etc.) 501 displayed on the display unit 320, the controller 330 displays personal information entry 511 corresponding to the selected "Steve" in an activated state (S330).

Then, in a state that the one personal information entry has been selected, the controller 330 checks whether a pre-stored first function button provided at the mobile terminal 300 (or first functional key, e, g, a correction button), and/or a pre-stored first function button (or first function key, e, g, a correction button) displayed on the display unit 320 is selected (S340).

If the pre-stored first function button provided at the mobile terminal 300 is selected as a check result in a state that the one personal information entry has been selected, the controller 330 displays, on the display unit 320, a pre-stored first screen including an edit screen, a keypad, etc. so that the user can correct the selected one personal information entry.

As one example, if a correction button (not shown), a pre-stored first function button provided at the mobile terminal 300 is selected in a state that the personal information entry 511 corresponding to the selected "Steve" has been selected, the controller 330 displays an edit screen 911 and a keypad 912 corresponding to the selected correction button on the display unit 320.

When the user selects one personal information entry from the one or more personal information entries as a check result in S320, the controller 330 may display the first screen pre-stored in the storage unit 310 and including an edit screen, a keypad, etc. on the display unit 320 (S350).

Then, once the user completely corrects content included in the selected personal information entry through the keypad, the controller 330 receives correction information (e.g., correction information on the selected personal information entry), and displays the category screen pre-stored in the storage unit 310 on the display unit 320. Here, the category screen may include a message category, a call history category, a file category, an e-mail category, etc.

Figure 9A:
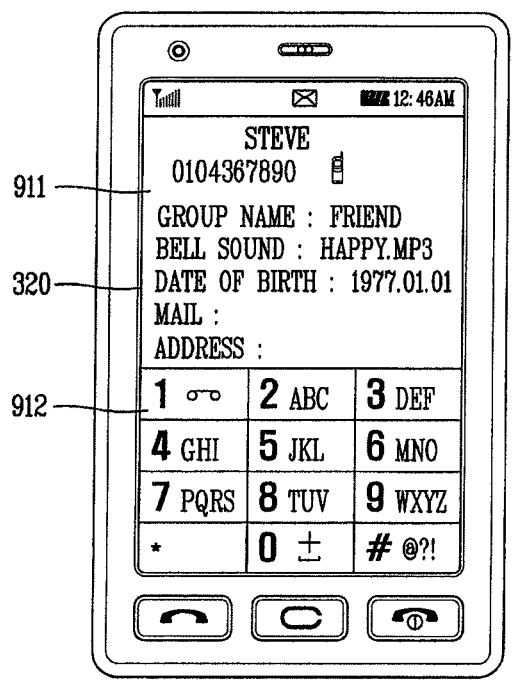
FIGS. 9A to 9D are views showing a screen of a display unit in accordance with a third embodiment of the present invention.
Figure 9B:
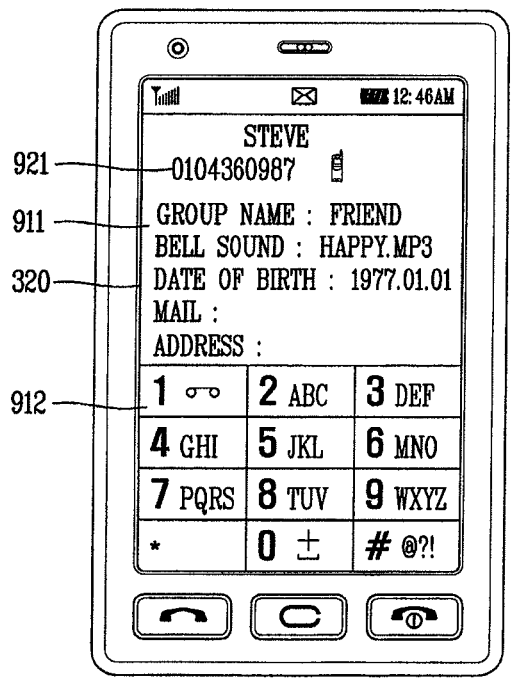
Figure 9C:
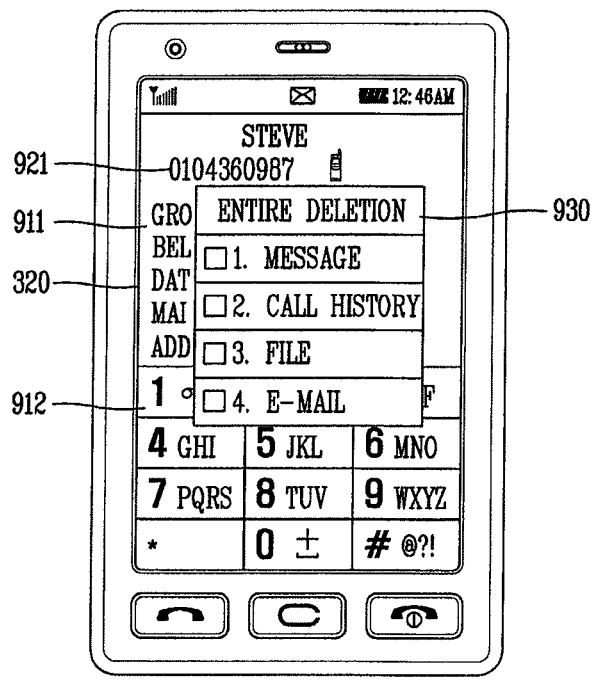

As one example, as shown in FIG. 9B, when a phone number 921 included in the personal information entry among contents included in personal information entries corresponding to the 'Steve' has been completely corrected, the controller 330 receives correction information on the corrected phone number. Then, the controller 330 displays the category screen 930 on the display unit 320 (S360).

Then, when at least one category is selected by the user from the category screen displayed on the display unit 320, the controller 330 corrects not only one personal information entry selected from the phone directory based on the corrected personal information entry (or correction information), but also information relating to the one personal information entries included in the selected at least one category (e.g., a name, a phone number, a photo, an e-mail address, an address, etc. included in the personal information entry).

Figure 9D:
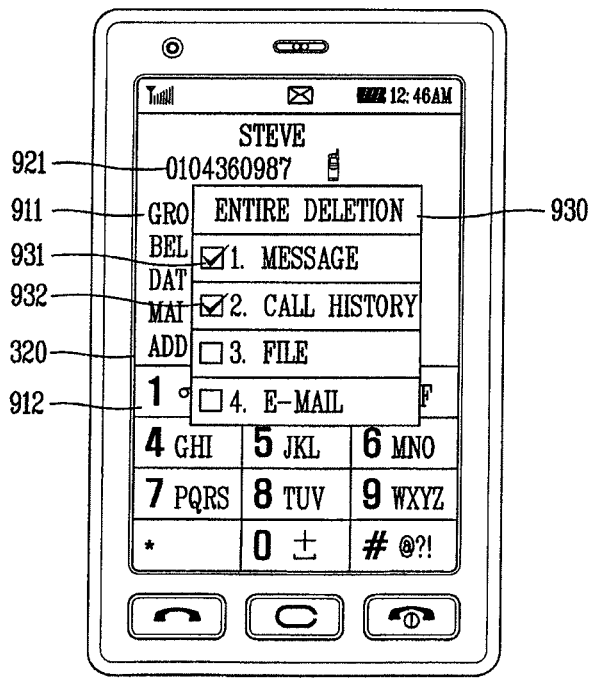

As one example, as shown in FIG. 9D, when a message category 931 and a call history category 932 are selected from the category screen 930, the controller 330 corrects (changes) the personal information entry 511 corresponding to the selected 'Steve' from personal information entries 501 included in the phone directory. And, the controller 330 corrects 'Steve'-related information included in the selected message category 931 and the call history category 932.

More concretely, the controller 330 corrects 'Steve'-related personal information entries stored in the phone directory based on the corrected (edited) personal information entry (or the correction information). Also, when a 'Steve'-related message (e.g., an outgoing message and/or an incoming message, etc.) is included in the selected message category, the controller 330 corrects information of all messages relating to the 'Steve' based on the corrected personal information entry. When a 'Steve'-related call history (e.g., an outgoing call history, an incoming call history, a missed call history, a reception standby call history, a video call history, etc.) is included in the selected call history category, the controller 330 corrects information on all the 'Steve'-related call histories based on the corrected personal information entry (S370).

When correcting content included in any personal information entry included in the phone directory, the mobile terminal 300 may selectively correct not only the personal information entry included in the phone directory, but also information relating to the personal information entry within another category included therein.

Figure 10:
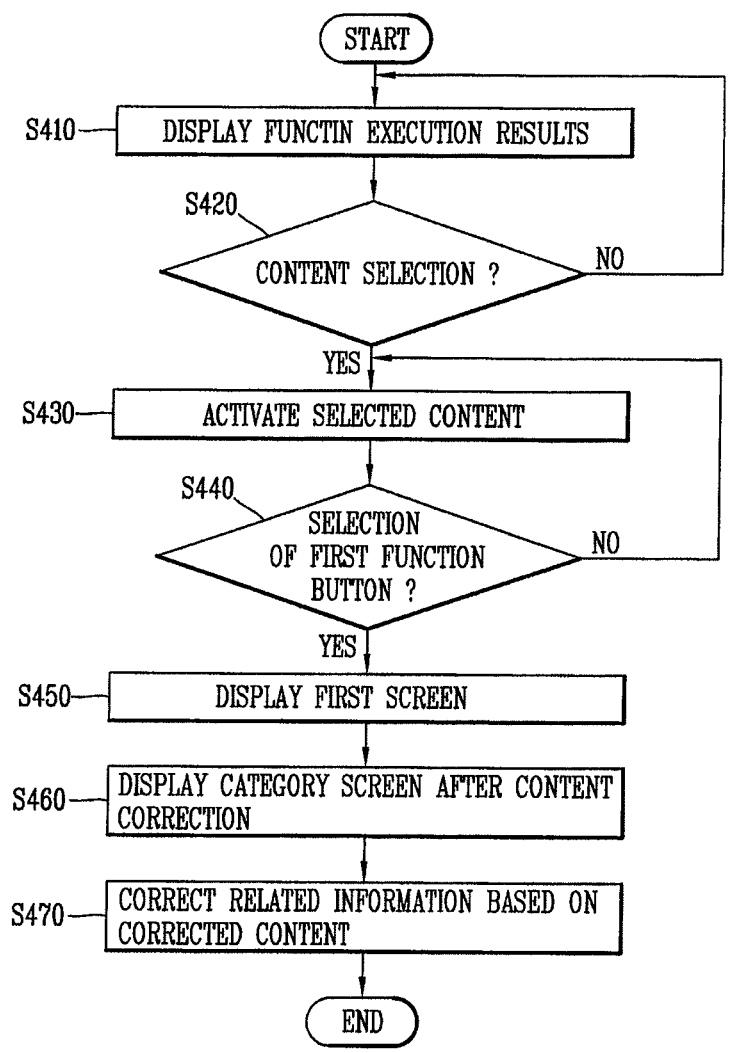
FIG. 10 is a flowchart showing a control method of a mobile terminal in accordance with a fourth embodiment of the present invention.

FIG. 10 is a flowchart showing a control method of a mobile terminal in accordance with a fourth embodiment of the present invention.

Firstly, the controller 330 executes any function (or any application program) pre-stored in the storage unit 310, and displays an execution result of the function (or data according to an execution result of the function) on the display unit 320. Here, the any function includes a message function, a call history function, a phone directory function, a file function, an e-mail function, etc.

For instance, as shown in FIG. 7A, the controller 330 displays, on the display unit 320, a call history, an execution result of a call history function (e.g., an outgoing call history, an incoming call history, a missed call history, a reception standby call history, a video call history, an outgoing message history, an incoming message history, etc.) 701 (S410).

Then, the controller 330 checks whether one content is selected by the user from the function execution results displayed on the display unit 320 (S420).

If one content is selected by the user from the function execution results as a check result, the controller 330 displays the selected content on the display unit 320 in an activated state. Here, the user's input for selecting one content from the function execution results displayed on the display unit 320 may be a touch input. And, touch on the display unit 320 may be one of proximity touch and contact touch.

For instance, when a user selects 'John' from a call history 701 displayed on the display unit 320, the controller 330 displays call history information 711 corresponding to the selected 'John' in an activated state as shown in FIG. 7B (S430).

Then, in a state that the content has been selected, the controller 330 checks whether a pre-stored first function button provided at the mobile terminal 300 (or first functional key, e, g, a correction button), and/or a pre-stored first function button (or first function key, e, g, a correction button) displayed on the display unit 320 is selected (S440).

If the pre-stored first function button provided at the mobile terminal 300 is selected as a check result in a state that the content has been selected, the controller 330 displays, on the display unit 320, a pre-stored first screen including an edit screen (including personal information entries stored in a phone directory/link screen), a keypad, etc. so that the user can correct the selected content. Here, the pre-stored first screen may be variously set according to a type of the selected content. More concretely, when the selected content is an image file, the first screen may include an edit screen, a brush screen, etc. for correcting the image file. When the selected content is a phone number, the first screen may include an edit screen, a keypad, etc. for correcting the phone number or personal information entry relating to the phone number.

As one example, if a correction button (not shown) provided at the mobile terminal 300 is selected in a state that the call history information 711 corresponding to the 'John' has been selected, the controller 330 displays, on the display unit 320, an edit screen 1111 and a keypad 1112 corresponding to the selected correction button.

Once one content is selected from a plurality of contents included in the function execution results as a check result in S420, the controller 330 may display the first screen pre-stored in the storage unit 310 and including an edit screen, a keypad, etc. on the display unit 320 (S450).

Once the selected content is completely corrected by the user, the controller 330 receives correction information (e.g., corrected information on the selected content) is received. Then, the controller 330 displays a category screen pre-stored in the storage unit 310 on the display unit 320. Here, the category screen may include a selected content (call history), a current category (corresponding to the call history category), a phone directory category, a message category, a file category, an e-mail category, etc.

Figure 11A:
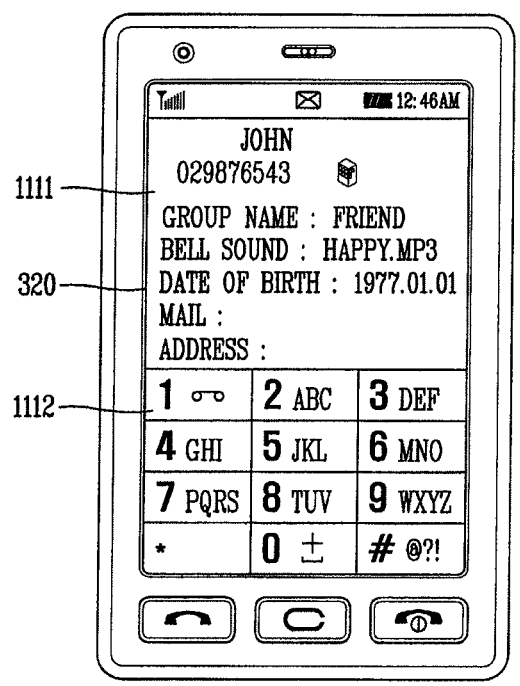
FIGS. 11A to 11E are views showing a screen of a display unit in accordance with a fourth embodiment of the present invention.
Figure 11B:
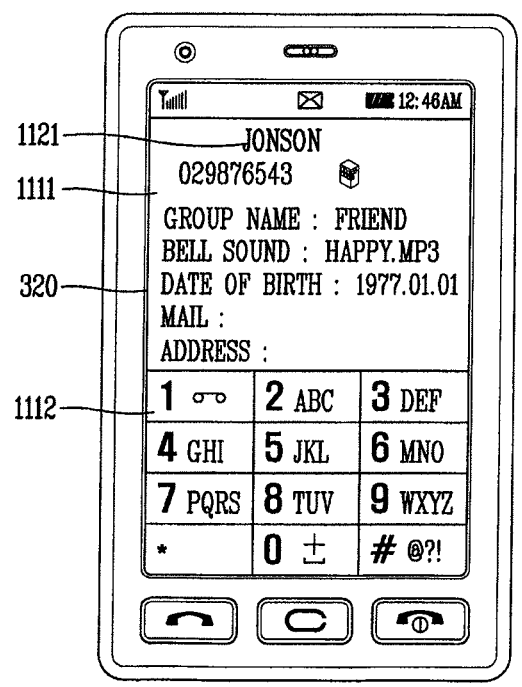

As one example, if a name 1121 included in personal information entry on 'John' included in the edit screen 1111 has been completely corrected into 'Jonson' as shown in FIG. 11B, the controller 330 displays the category screen 1130 on the display unit 320 (S460).

Then, once the user selects at least one category included in the category screen displayed on the display unit 320, the controller 330 corrects information relating to the selected content included in the selected at least one category (e.g., a name, a phone number, a photo, an e-mail address, an address, etc. included in personal information entry corresponding to the content), based on information of the corrected content (or correction information).

Figure 11C:
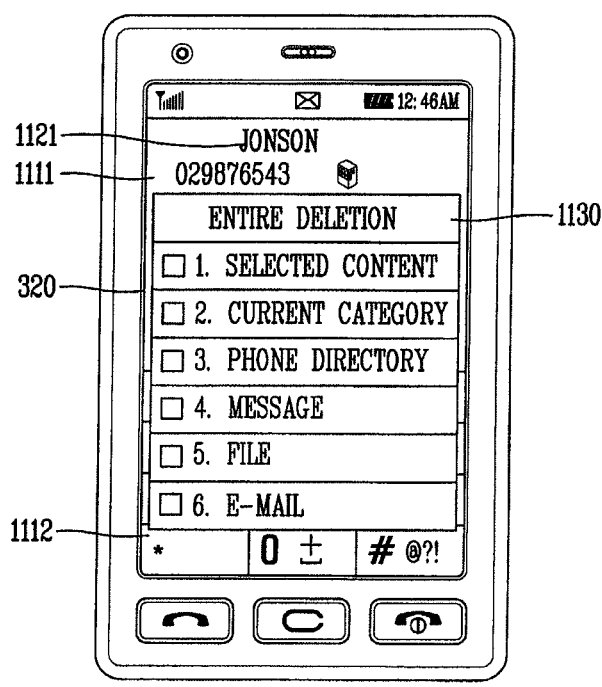
Figure 11D:
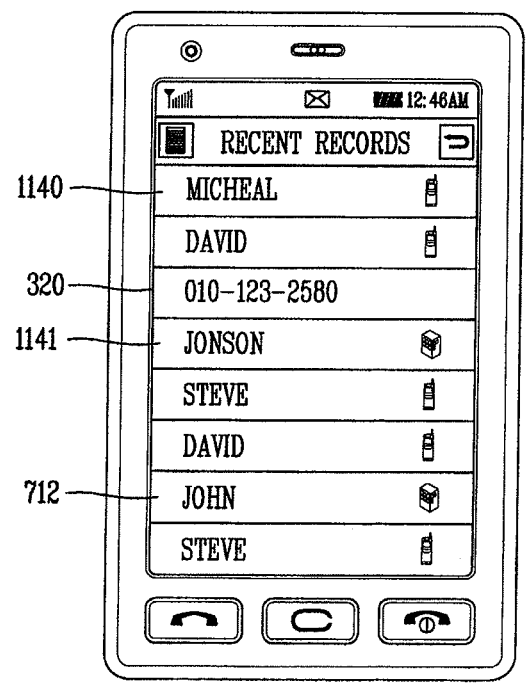

For instance, when a 'selected content' is selected from the category screen 1130 shown in FIG. 11C, the controller 330 corrects the call history information 711 corresponding to the selected 'John' according to the selected content. FIG. 11D is a view showing a corrected state 1140 of the call history information 711 corresponding to the 'John' into 'Johnson' 1141. As shown in FIG. 11D, only the call history information 711 corresponding to the selected 'John' according to the selected content is deleted, but call history information 712 corresponding to another 'John' is maintained.

Figure 11E:
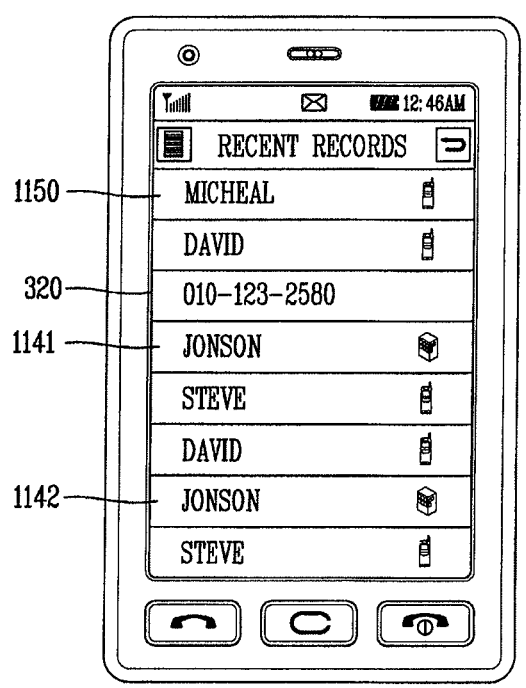

As another example, when a 'current category' is selected from the category screen 1130 shown in FIG. 11C, the controller 330 corrects all of call history information 711 and 712 corresponding to the 'John' according to the selected content, from the call history 701. FIG. 11E is a view showing a corrected state 1150 of all the call history information 711 and 712 corresponding to the 'John' into 'Johnson' 1141 and 1142.

As still another instance, when a 'selected content' category and a 'phone directory' category are selected from the category screen 1130 shown in FIG. 11C, the controller 330 corrects the call history information 711 corresponding to the 'John' according to the selected content from the call history 701. And, the controller 330 corrects 'John'-related information (including personal information content) included in the phone directory category. That is, when a name has been corrected from the call history 701, the name is also corrected from the 'John'-related personal information entries included in the phone directory category.

As yet still another instance, when a 'selected content' category and a 'message' category are selected from the category screen 720 shown in FIG. 7C, the controller 330 corrects the call history information 711 corresponding to the 'John' according to the selected content from the call history 701. And, the controller 330 corrects all of 'John'-related information included in the message category (S470).

In the mobile terminal and the control system thereof according to the present invention, when deleting a pre-stored specific person's address, messages exchanged with the specific person, a call history, relevant files, etc. classified into each category are also deleted in a selective manner. This may enhance efficiency in managing the mobile terminal.

Furthermore, when changing a pre-stored specific person's address, messages exchanged with the specific person, a call history, contents associated with a relevant file, etc. classified into each category are also changed, based on the changed contents. This may enhance the user's convenience.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims

What is claimed is:

1. A method of displaying call history information in a first mobile device communicating with at least one second mobile device, the method comprising:
    displaying a call history screen on a display unit, wherein the call history screen includes information on an outgoing call history to the at least one second mobile device, information on an incoming call history from the at least one second mobile device, information on a missed call history about the at least one second mobile device, and information on a video call history about the at least second mobile device;
    displaying a specific content on the display unit in an activated state in response to a selection of the specific content;
    displaying at least one edit screen on the display unit after the specific content is selected;
    deleting selectively the selected specific content corresponding to a pre-stored name or multiple contents including non-selected content corresponding to the pre-stored same name on the call history screen based on input on a first edit screen; and
    changing the pre-stored name corresponding to the selected specific content into an edited name in a specific category selected by a user as well as the call history screen and changing the pre-stored name corresponding to all non-selected content into the same edited name in the specific category selected by the user as well as the call history screen based on input on a second edit screen.

2. The method of claim 1, further comprising:
    displaying a third edit screen in response to a selection of a correction button on the display unit; and
    displaying a fourth edit screen, wherein the fourth edit screen is changeable depending on a type of the specific content.

3. The method of claim 2, wherein the fourth edit screen includes a keypad if the specific content corresponds to a phone number while the fourth edit screen includes a brush screen for correcting an image file if the specific content corresponds to the image file.

4. The method of claim 2, wherein the fourth edit screen includes an edit screen for correcting a personal information entry relating to the phone number.

5. The method of claim 4, wherein the personal information entry includes group information.

6. The method of claim 5, wherein the fourth edit screen includes a link screen for correcting the group information.

7. The method of claim 5, further comprising:
    storing both the call history screen and the personal information entry in a memory.

8. The method of claim 1, wherein the selection of the specific content is recognized by using a pointer.

9. The method of claim 8, wherein the pointer is recognized based on a contact touch as well as a proximity touch.

10. The method of claim 1, wherein the first mobile device corresponds to a mobile phone, a smart phone, a laptop computer, or a Personal Digital Assistant (PDA).

11. A mobile device for displaying call history information and communicating with at least one mobile device, the mobile device comprising:
    a memory configured to store data;
    a sensor configured to recognize at least one of command;
    a display unit configured to display the stored data according to the recognized command; and
    a controller configured to:
        control the memory, the sensor and the display unit,
        display a call history screen on a display unit, wherein the call history screen includes information on an outgoing call history to the at least one mobile device, information on an incoming call history from the at least one mobile device, information on a missed call history about the at least one mobile device, and information on a video call history about the at least mobile device, display a specific content on the display unit in an activated state in response to a selection of the specific content, display at least one edit screen on the display unit after the specific content is selected, delete selectively the selected specific content corresponding to a pre-stored name or multiple contents including non-selected content corresponding to the pre-stored same name on the call history screen based on user input on a first edit screen, and change the pre-stored name corresponding to the selected specific content into an edited name in a specific category selected by a user as well as the call history screen and changing the pre-stored name corresponding to all non-selected content into the same edited name in the specific category selected by the user as well as the call history screen based on input on a second edit screen.

12. The mobile device of claim 11, wherein the controller is further configured to:

display a third edit screen in response to a selection of a correction button on the display unit, and display a fourth edit screen, wherein the fourth edit screen is changeable depending on a type of the specific content.

13. The mobile device of claim 12, wherein the fourth edit screen includes a keypad if the specific content corresponds to a phone number while the fourth edit screen includes a brush screen for correcting an image file if the specific content corresponds to the image file.

14. The mobile device of claim 12, wherein the fourth edit screen includes an edit screen for correcting a personal information entry relating to the phone number.

15. The mobile device of claim 14, wherein the personal information entry includes group information.

16. The mobile device of claim 15, wherein the fourth edit screen includes a link screen for correcting the group information.

17. The mobile device of claim 15, wherein the memory is further configured to store both the call history screen and the personal information entry.

18. The mobile device of claim 11, wherein the selection of the specific content is recognized by using a pointer.

19. The mobile device of claim 18, wherein the pointer is recognized based on a contact touch as well as a proximity touch.

20. The mobile device of claim 11, wherein the mobile device corresponds to a mobile phone, a smart phone, a laptop computer, or a Personal Digital Assistant (PDA).

* * * * *